(12) United States Patent
Lam

(10) Patent No.: US 11,768,547 B2
(45) Date of Patent: Sep. 26, 2023

(54) FOLDABLE MOUSE

(71) Applicant: Hok Man Lam, Hong Kong (HK)

(72) Inventor: Hok Man Lam, Hong Kong (HK)

( * ) Notice: Subject to any disclaimer, the term of this patent is extended or adjusted under 35 U.S.C. 154(b) by 0 days.

(21) Appl. No.: 17/966,165

(22) Filed: Oct. 14, 2022

(65) Prior Publication Data

US 2023/0119533 A1 Apr. 20, 2023

(30) Foreign Application Priority Data

Oct. 14, 2021 (HK) .............................. 32021040415.0

(51) Int. Cl.
*G06F 3/0354* (2013.01)
(52) U.S. Cl.
CPC ................................. *G06F 3/03543* (2013.01)
(58) Field of Classification Search
CPC .................................................. G06F 3/03543
USPC ......................................................... 345/163
See application file for complete search history.

(56) References Cited

U.S. PATENT DOCUMENTS

2016/0364020 A1* 12/2016 Deng ................... G06F 3/03543

FOREIGN PATENT DOCUMENTS

| CN | 202217240 U | * | 5/2012 | |
|---|---|---|---|---|
| CN | 111862730 A | * | 10/2020 | |
| JP | 2007168207 A | * | 7/2007 | |
| WO | WO-2019023940 A1 | * | 2/2019 | ............. G06F 3/033 |

OTHER PUBLICATIONS

Ho (Matt Ho, "Rugged Angular Gaming Mice", Trendhunter.com Jul. 2011, downloaded from web on Jan. 31, 2023 from https://web.archive.org/web/20111023112459/https://www.trendhunter.com/trends/rude-gameware-fierce-3500) (Year: 2011).*

* cited by examiner

*Primary Examiner* — Mark Edwards

(57) ABSTRACT

The application herein provides a foldable mouse and the solution is: the mouse comprise a foldable substrate and a circuit board, wherein the foldable substrate includes at least five planes connected in sequence, two planes of the foldable substrate are connected by means of a detachable connection, in case that these two planes are not connected, the foldable substrate can be unfolded, in the case that there two planes are connected, the foldable base plate can be folded to be a bent pyramid, and the circuit board is arranged on the inner side of the foldable base plate. This application can fold the mouse to make it easy to be carried.

7 Claims, 4 Drawing Sheets

Magnet holds the form after fold.

FOLDABLE MOUSE

TECHNICAL FIELD

This application relates to the field of electronics and machinery, and in particular to a foldable mouse.

BACKGROUND

The mouse is an external input device of a computer. It is an indicator of the vertical and horizontal coordinates of on computer display. The use of the mouse is to make the operation of the computer easier and faster, to replace some functions of a keyboard.

Since the creation of the mouse, its appearance and structure have continuously changed. New mice are more comfortable to use, more ergonomic, and more convenient to carry. At present, mainstream mice are designed in an arch curved shape, with a bottom size about, half to a palm of, an adult, and the height is generally between 3 cm and 5 cm.

The existing mouse is still large. If it is placed in a small bag such as a briefcase or a computer bag, the arched shape will cause the bag to bulge, which may not be convenient to carry.

SUMMARY

This application herein provides a foldable mouse to solve one or more technical problems in the prior art.

According to one aspect of the application herein, a foldable mouse is provided, comprising:

a foldable substrate, which includes at least five planes connected in sequence, wherein two planes of the foldable substrate are connected by means of a detachable connection, in case that these two planes are not connected, the foldable substrate can be unfolded and in the case that there two planes are connected, the foldable base plate can be folded to be a bent pyramid; and a circuit board, which is arranged on the inner side of the foldable base plate.

The technical solution provided by the application herein has the following effects:

In the technical solution provided by this application, the foldable substrate is composed of at least five planes connected in sequence, wherein the connection of two planes is a detachable connection. When the two planes are not connected, the foldable substrate can be unfolded to be a flat plane. When the two planes are connected, the foldable base plate is folded into a bent pyramid. Thereby, the foldable function of the mouse is realized, and it is convenient for people to carry the mouse.

It should be understood that the content described in this section is not intended to identify the key or important features of the embodiments of this application, nor is it intended to limit the scope of this application. Other features of this application will be easily understood through the following description.

BRIEF DESCRIPTION OF THE DRAWINGS

The drawings are used to better understand the solution, and do not constitute a limitation to the application in.

REFERENCE NUMBERS

100—foldable substrate;
101—first plane; 102—second plane; 103—third plane; 104—fourth plane; 105—fifth plane;
200—circuit board;
201—right-click switch module; 202—left-click switch module; 203—movement sensor and scroll module; 204—signal processing module; 205—battery;
206—magnetic switch; 207—magnet;
208—first soft surface material, 209—second soft surface material.

DETAILED DESCRIPTION OF EMBODIMENTS

Certain exemplary embodiments are described below. As can be recognized by a person skilled in the art, the exemplary embodiments described can be modified in the most varied of ways without departing from the scope or spirit of the application. Accordingly, the accompanying figures and description are to be regarded as exemplary rather than restrictive.

Referring to FIGS. 1 to 4, which show the structure of the foldable mouse provided by the application embodiment herein.

The foldable substrate can include at least five successively connected planes, and two planes of them are connected by means of a detachable connection. When the connection of these two planes is disassembled, the foldable substrate can be unfolded into a plane. When the two planes are kept connected, the foldable substrate can form a bent pyramid. The inner side of the foldable substrate is provided with a circuit board, which can realize the function of the mouse as an input device of the computer.

Figure 1:
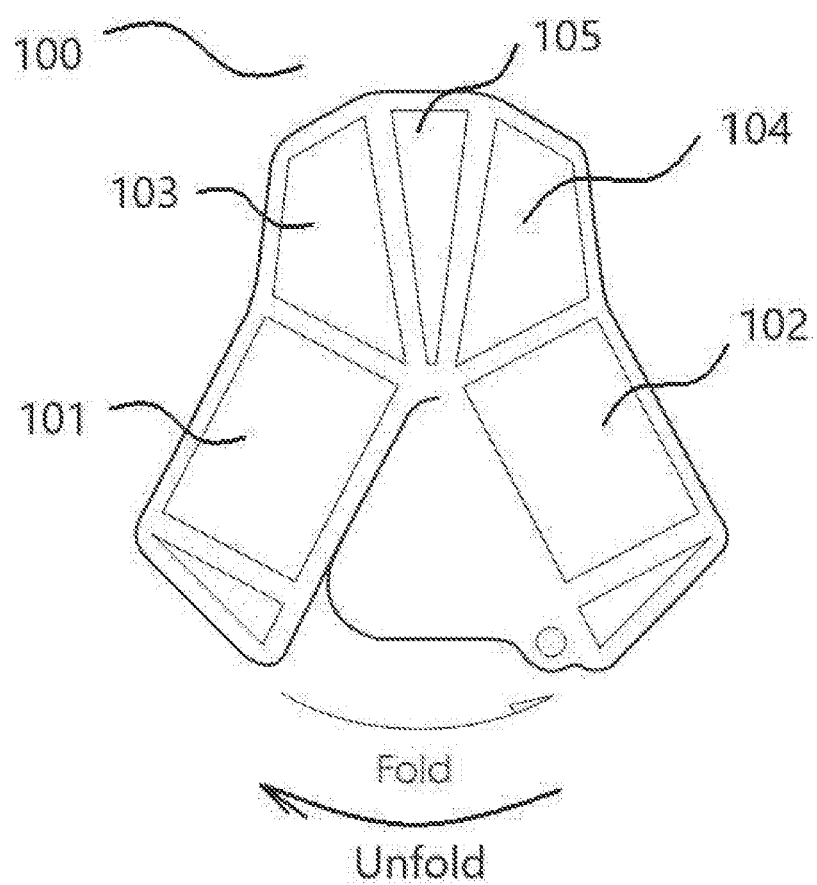
FIG. 1 is a schematic diagram showing a foldable substrate according to the first embodiment of the application herein.
Figure 2:
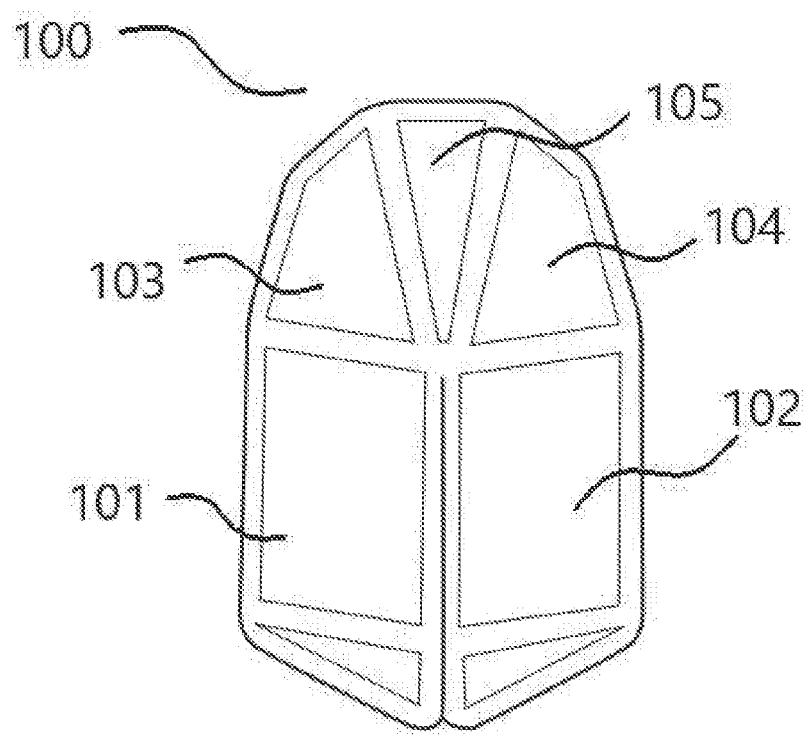
FIG. 2 is a schematic diagram of a foldable substrate according to a second embodiment of the application herein.
Figure 3:
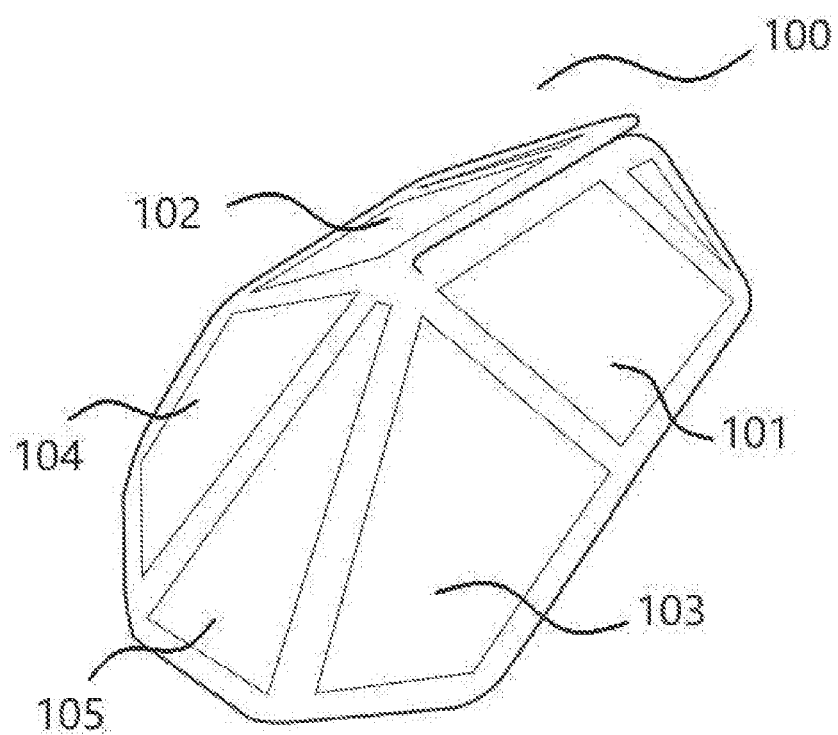
FIG. 3 is a schematic diagram of a foldable substrate according to a third embodiment of the application herein.

As shown in FIGS. 1 to 3, the foldable substrate is composed of five planes, which, are a first plane, a second plane, a third plane, a fourth plane, and a fifth plane. The first plane is symmetrical with the second plane, and the third plane is symmetrical with the fourth plane. The first plane and the fifth plane are connected on two sides of the third plane, and the second plane and the fifth plane are connected on two sides of the fourth plane. The first plane is connected to the second plane by means of a detachable connection.

As shown in FIG. 1, when the connection between the first plane and the second plane is disassembled, the foldable substrate can be unfolded into a plane, or the foldable substrate can be folded based on the edges of these planes.

As shown in FIGS. 2 and 3, when the first plane is connected to the second plane, the foldable substrate can be folded to form a bent pyramid. This bent pyramid can be similar to the shape of a mouse.

Illustratively, when the first plane and the second plane are kept connected, the edge between the first plane and the second plane is on the same axis of the central axis of the fifth plane. This allows the mouse to form an axisymmetric stereoscopic structure.

Illustratively, the detachable connection between the first plane and the second plane is a magnetic connection. For example, some magnetic substances are arranged on the edge connecting the first plane and the second plane.

Figure 4:
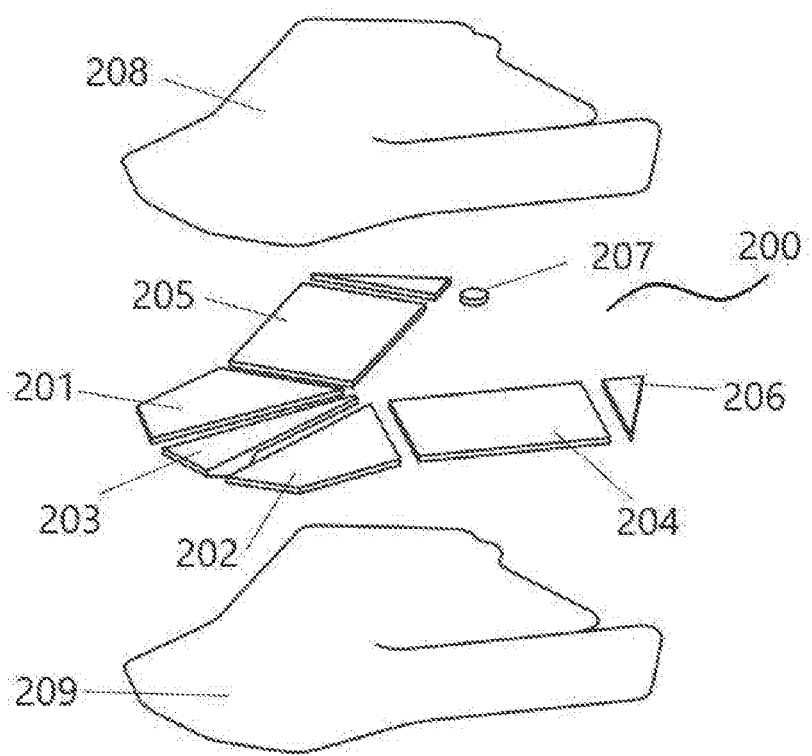
FIG. 4 is a schematic diagram of the internal structure of a foldable mouse according to a fourth embodiment of the application herein.

As shown in FIG. 4, a magnetic switch and a magnet can be arranged in the mouse. The magnetic switch is arranged in an area close to the second plane in the first plane, and the magnet is arranged in an area close to the first plane in the second plane. When the magnetic switch is turned on, the first plane can be detached from the second plane and away from the second plane, so that the foldable substrate can be unfolded. When the magnetic switch is closed, the magnet in the second plane will attract the magnetic switch in the first plane to make the first plane close to the second plane, so that the first plane and the second plane can be magnetically connected to form a bent pyramid.

Exemplarily, the area of the first plane is greater than the area of the third plane, and the area of the third plane is greater than the area of the fifth plane. In this example, the shape of the foldable mouse can be ergonomic.

As shown in FIG. 4, the circuit board of the foldable mouse includes a right-click switch module, a left-click switch module, a movement sensor, a scroll module, a signal processing module, and a battery.

The left-click switch module can be arranged on the inner side of the third plane, the right-click switch module can be arranged on the inner side of the fourth plane, the movement sensor and the scroll module can be arrange on the inner side of the fifth plane, and the signal processing module and the battery can be arranged on the inner side of the first plane and the second plane.

As shown in FIG. 4, the foldable mouse can also have a first soft surface material and a second soft surface material. The first soft flat material covers the upper surface of the foldable substrate, and the second soft surface material covers the lower surface of the circuit board.

In the description of this specification, it should be understood that the terms "center", "longitudinal", "transverse", "length", "width", "thickness", "upper", "lower", "front", "Back", "Left", "Right", "Vertical", "Horizontal", "Top", "Bottom", "Inner", "Outer", "Clockwise", "Counterclockwise", "Axial", "Radial", "Circumferential", etc. indicate the orientation or positional relationship based on the orientation or positional relationship shown in the drawings. They are only for the convenience of describing the application and simplifying the description, and do not indicate or imply the device or The element must have a specific orientation, be constructed and operated in a specific orientation, and therefore cannot be understood as a limitation of the present application.

In addition, the terms "first" and "second" are only used for descriptive purposes, and cannot be understood as indicating or implying relative importance or implicitly indicating the number of indicated technical features. Thus, the features defined with "first" and "second" may explicitly or implicitly include one or more of these features. In the description of the present application, "multiple" means two or more than two, unless otherwise specifically defined.

In this application, unless otherwise clearly specified and limited, the terms "installed", "connected", "connected", "fixed" and other terms should be understood in a broad sense, for example, it can be a fixed connection or a detachable connection, or integrated; it can be a mechanical connection, it can be an electrical connection, it can also be communication; it can be directly connected, or indirectly connected through an intermediate medium, it can be the internal communication of two components or the interaction relationship between two components. For those of ordinary skill in the art, the specific meanings of the above-mentioned terms in this application can be understood according to specific circumstances.

In this application, unless expressly stipulated and defined otherwise, the "above" or "below" of the first feature of the second feature may include direct contact between the first and second features, or may include the first and second features Not in direct contact but through other features between them. Moreover, "above", "above" and "above" the second feature of the first feature include the first feature being directly above and obliquely above the second feature, or it simply means that the level of the first, feature is higher than that of the second feature. The "below". "below", and "below" of the first feature of the second feature include the first feature directly above and diagonally above the second feature, or it simply means that the level of the first feature is smaller than the second feature.

The above disclosure provides many different embodiments or examples for realizing different structures of the present application. In order to simplify the disclosure of the present application, the components and settings of specific examples are described above. Of course, they are only examples, and are not intended to limit the application. In addition, the present application may repeat reference numerals and/or reference letters in different examples. Such repetition is for the purpose of simplification and clarity, and does not indicate the relationship between the various embodiments and/or settings discussed.

The above is a specific implementation of this application. The scope of protection of this application is not limited thereto. Any person skilled in the art can easily think of various changes or substitutions within the technical scope disclosed in this application. These should be covered in the scope of protection of this application. Therefore, the protection scope of this application shall be subject to the protection scope of the claims.

What is claimed is:

1. A foldable mouse, comprises:
    a foldable substrate, which includes at least five planes connected in sequence, wherein two planes of the foldable substrate are connected by means of a detachable connection, in case that these two planes are not connected, the foldable substrate can be unfolded and in the case that these two planes are connected, the foldable substrate can be folded to be a bent pyramid; and
    a circuit board, which is arranged on an the inner side of the foldable substrate;
    wherein the foldable substrate comprises a first plane, a second plane, a third plane, a fourth plane, and a fifth plane, and the first plane is symmetrical with the second plane, the third plane is symmetrical with the fourth plane, the first plane and the fifth plane are connected on both sides of the third plane, and the second plane and the fifth plane are connected on both sides of the fourth plane, the first plane is connected to the second plane by means of the detachable connection;
    wherein the circuit board comprises a right-click switch module, a left-click switch module, a movement sensor, a scroll module, a signal processing module, and a battery;
    wherein the left-click switch module is arranged on an inner side of the third plane, and the right-click switch module is arranged on an inner side of the fourth plane, the movement sensor and the scroll module are arranged on an inner side of the fifth plane, and the signal processing module and the battery are arranged on an inner side of the first plane and the second plane.

2. The mouse according to claim 1, wherein the detachable connection is a magnetic connection.

3. The mouse according to claim 1, wherein when the first plane and the second plane remain connected, an edge between the first plane and the second plane is on a same axis of a central axis of the fifth plane.

4. The mouse according to claim 1, wherein a magnetic substance is provided on the edge connecting the first plane and the second plane.

5. The mouse of claim 1, wherein an area of the first plane is larger than an area of the third plane, and the area of the third plane is larger than an area of the fifth plane.

6. The mouse according to claim 1, wherein the mouse further comprises a magnetic switch and a magnet, the magnetic switch is provided in an area close to the second plane in the first plane, and the magnet is provided in an area close to the first plane in the second plane.

7. The mouse according to claim 1, wherein the mouse further comprises a first soft surface material and a second soft surface material, the first soft surface material covers an upper surface of the foldable substrate, and the second soft surface material covers a lower surface of the circuit board.

\* \* \* \* \*